United States Patent
Trani

(10) Patent No.: US 10,419,484 B2
(45) Date of Patent: Sep. 17, 2019

(54) SYSTEM AND METHOD FOR COMMUNICATING WITH SECURITY DEVICES WITHIN SECURE NETWORKS

(71) Applicant: Sensormatic Electronics, LLC, Boca Raton, FL (US)

(72) Inventor: James Trani, Billerica, MA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 492 days.

(21) Appl. No.: 15/055,973

(22) Filed: Feb. 29, 2016

(65) Prior Publication Data

US 2017/0251021 A1  Aug. 31, 2017

(51) Int. Cl.
| | |
|---|---|
| *H04L 29/06* | (2006.01) |
| *H04W 12/08* | (2009.01) |
| *H04B 11/00* | (2006.01) |
| *H04W 4/80* | (2018.01) |

(52) U.S. Cl.
CPC ............. *H04L 63/20* (2013.01); *H04B 11/00* (2013.01); *H04L 63/0492* (2013.01); *H04L 63/102* (2013.01); *H04W 4/80* (2018.02); *H04W 12/08* (2013.01)

(58) Field of Classification Search
CPC . H04L 12/2823; H04L 12/2825; H04L 63/20; H04L 63/0492; H04L 63/102; H04W 4/80; H04W 12/08; H04B 11/00
See application file for complete search history.

(56) References Cited

U.S. PATENT DOCUMENTS

| | | | |
|---|---|---|---|
| 9,064,394 B1* | 6/2015 | Trundle | G08B 13/19684 |
| 2005/0028034 A1* | 2/2005 | Gantman | G06F 11/0748 |
| | | | 714/27 |
| 2005/0265530 A1* | 12/2005 | Hundal | H04M 1/573 |
| | | | 379/142.01 |
| 2006/0050642 A1* | 3/2006 | Chini | H04B 3/542 |
| | | | 370/241 |
| 2013/0191885 A1* | 7/2013 | Hubner | G06F 21/6218 |
| | | | 726/5 |
| 2014/0039901 A1* | 2/2014 | Mosko | H04M 11/066 |
| | | | 704/500 |

* cited by examiner

*Primary Examiner* — Yogesh Paliwal

(74) *Attorney, Agent, or Firm* — HoustonHogle LLP

(57) ABSTRACT

A system and method for diagnosing and/or configuring a security device included within a secure network is disclosed. A technician mobile computing device maintains a data connection between the security device and a remote computer diagnostic workstation, where the computer workstation might send configuration commands to the security device and receives diagnostic data from the security device over the data connection. The technician mobile phone maintains the data connection by establishing a wireless data link to the security device and by encoding data onto and/or decoding data from a voice connection to a peer mobile computing device. A WiFi connection between the peer mobile computing device and the computer workstation then completes the data connection between the security device and the computer diagnostic workstation.

18 Claims, 4 Drawing Sheets

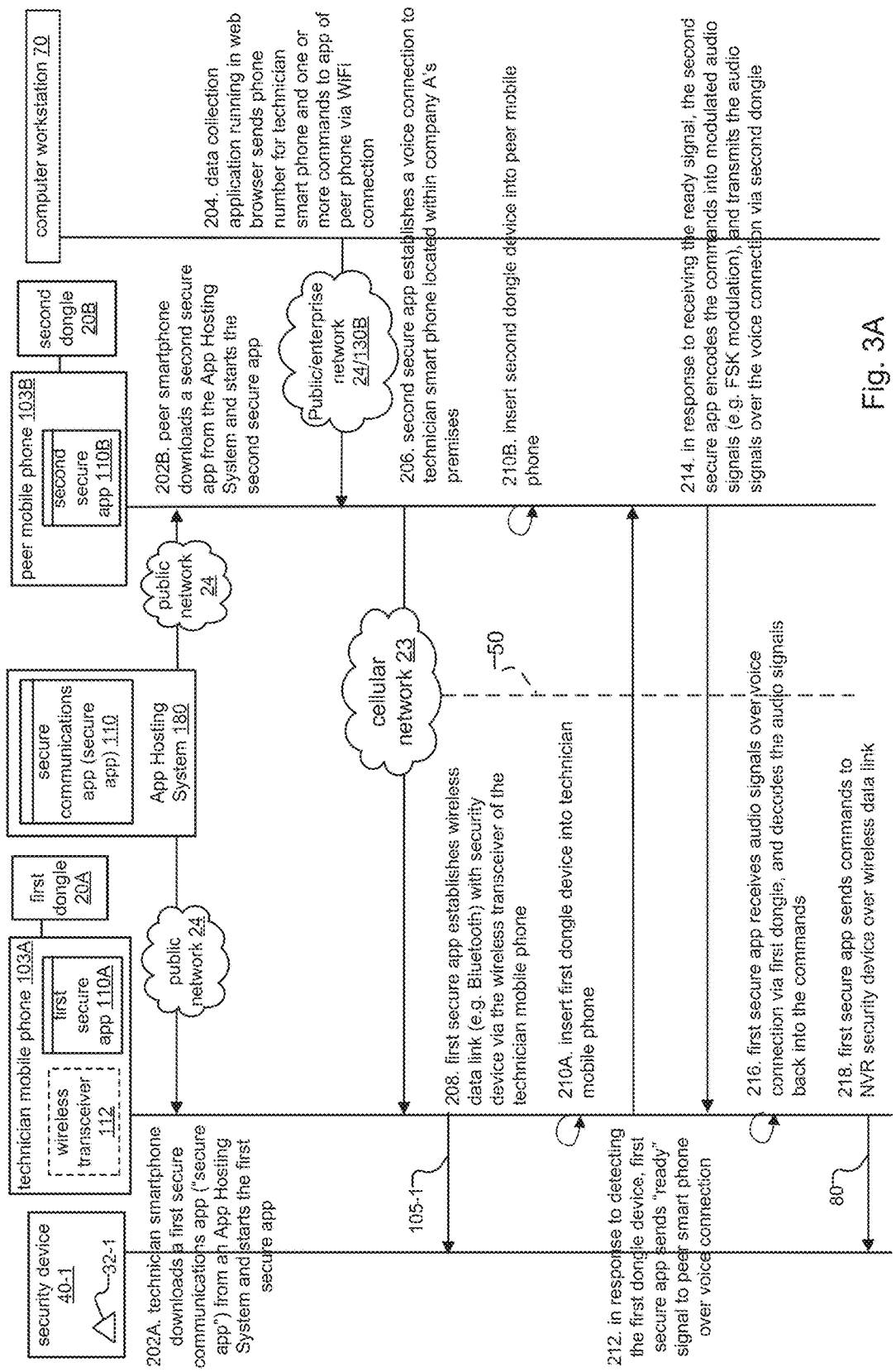

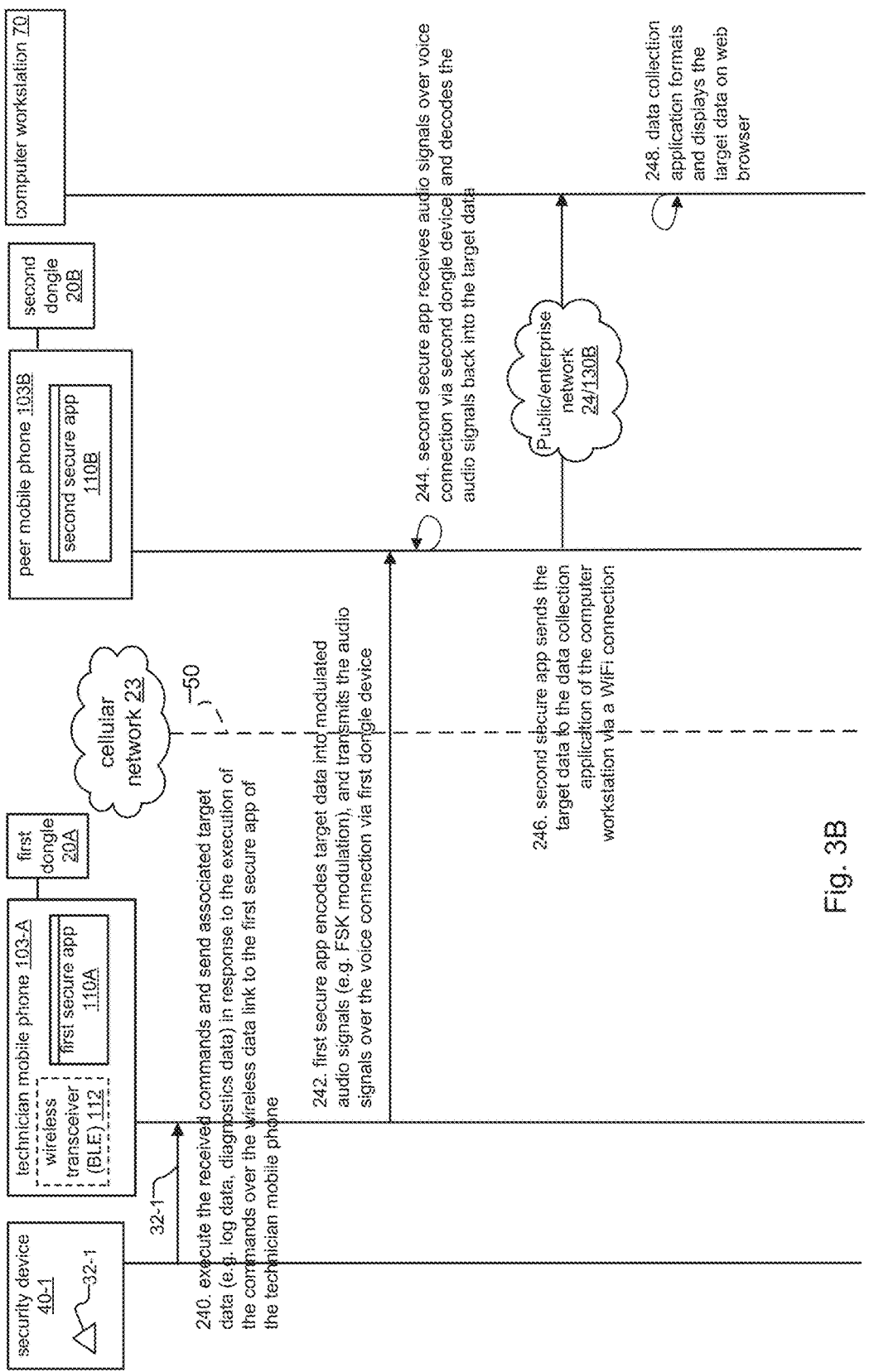

Figure 1:
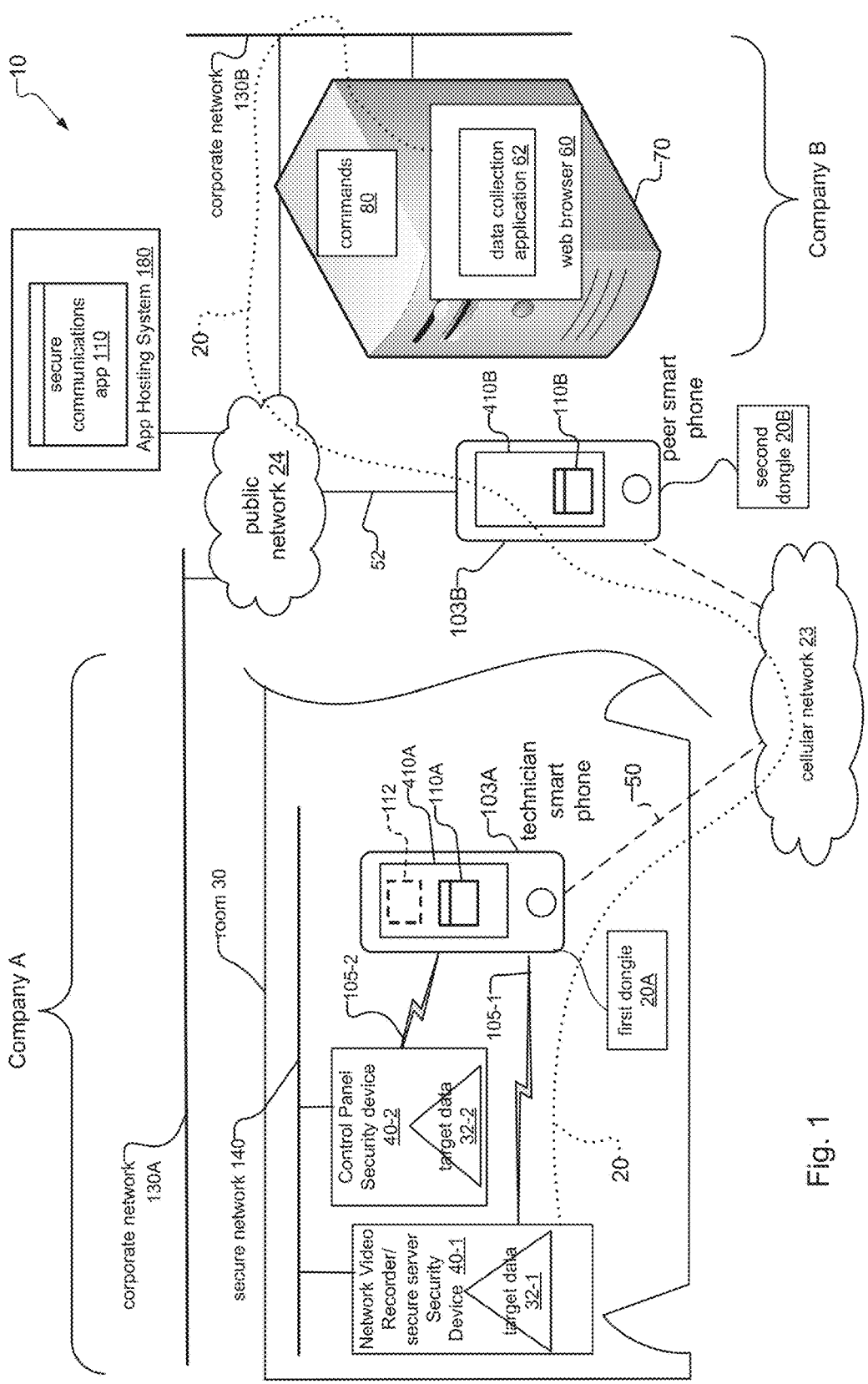

SYSTEM AND METHOD FOR COMMUNICATING WITH SECURITY DEVICES WITHIN SECURE NETWORKS

BACKGROUND OF THE INVENTION

Security devices such as secured servers, surveillance cameras, security control panels and network video recorders (NVRs) are often installed in secure networks to provide enhanced protection against cyber threats and attacks upon the devices. The secure networks are typically intentionally isolated from the company's enterprise networks. Moreover, physical access to these networks and the security devices operating on the networks may also be secured to prevent physical tampering.

While providing enhanced security for the devices and for data obtained from or stored by the devices, secure networks create problems when attempting to access the security devices from a remote location to install, troubleshoot, configure, and check status of the security devices. Currently, the manufacturers, installers, integrators, and/or third party administrators of the security devices must dispatch field service technicians to the customer site where the security devices are installed. This allows the technicians to physically access the security devices without compromising the security of the secure networks that could occur by enabling remote access to the networks or otherwise compromise the partitioned nature of the secure networks.

SUMMARY OF THE INVENTION

It is very costly and time consuming to dispatch technicians to customer premises for the purpose of installing, troubleshooting, configuring, and checking the status of security devices on secure networks. Moreover, the manufacturers or third party administrators typically have more technical resources and personnel at their home offices. And, personnel there can often more efficiently and effectively analyze the security devices and data from the devices than the on-premises technicians, and they may be more experienced. Nevertheless, there is often no way to move information between the security devices and the remote personnel to diagnose and support the troubleshooting, configuring, and checking the status of security devices on the secure networks.

The present invention in its embodiments enables the movement of data between a security device, such a device on a secured network, or even a device with no network connection, by using a cellular voice connection and then encoding the data for transmission over this connection.

In general, according to one aspect, the invention features a system for enabling diagnosis and/or configuration of a device such as a security device on a secure network. The system comprises a diagnostic workstation used for the diagnosis and/or configuration of the security device and a technician mobile computing device that maintains a data connection between the security device and the computer workstation by establishing a wireless data link to the security device and by encoding data onto and/or decoding data from a voice connection.

In a current embodiment, the wireless data link is a short distance wireless link such as a near field communications link or Bluetooth radio frequency link. A peer-to-peer WiFi connection could also be used, for example. Often the link is established with a security device such as secure server, network video recorder and/or security control panel.

A peer mobile computing device is preferably included that communicates with the technician mobile computing device over the voice connection and encodes the data onto and/or decodes the data from the voice connection for the diagnostic workstation. These mobile computing device can use transceiver dongles. This peer mobile computing device might communicate with the computer diagnostic workstation over WiFi, for example.

This system can be used so that the computer workstation receives data over the data connection from the security device for the diagnosis of the security device. Further, the computer workstation can send target commands over the voice connection for the configuration of the security device.

An app will typically execute on the technician mobile computing device and/or the peer mobile device that encodes the data onto and/or decodes the data from the voice connection using frequency shift key modulation of an audible frequency carrier wave.

In general, according to another aspect, the invention features a method for enabling diagnosis and/or configuration of a security device on a secure network. The method comprises establishing a data connection between the security device and a computer workstation by establishing a wireless data link between a technician mobile computing device and the security device and establishing a voice connection between the technician mobile computing device and the computer workstation and transmitting data and/or commands over the data connection between the security device and the computer workstation by encoding data onto and/or decoding data from the voice connection.

In general, according to another aspect, the invention features a mobile computing device. This device comprises an audio transceiver dongle that enables audio coupling between a microphone input and a speaker output of the mobile computing device and an application program that encodes data onto and/or decodes data from a voice connection via the audio transceiver dongle.

In general, according to another aspect, the invention features a dongle for a mobile computing device. This dongle comprises an audio transceiver that enables audio coupling of signals between a microphone input and a speaker output of the mobile computing device and a gain control for adjusting an amplitude of the signals.

In general, according to another aspect, the invention features a mobile computing device. It executes an application program that establishes a wireless data link to a security device, establishes a voice connection to a computer workstation, and encodes data onto and/or decodes from the voice connection for diagnosis and/or configuration of the security device.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

Figure 2:
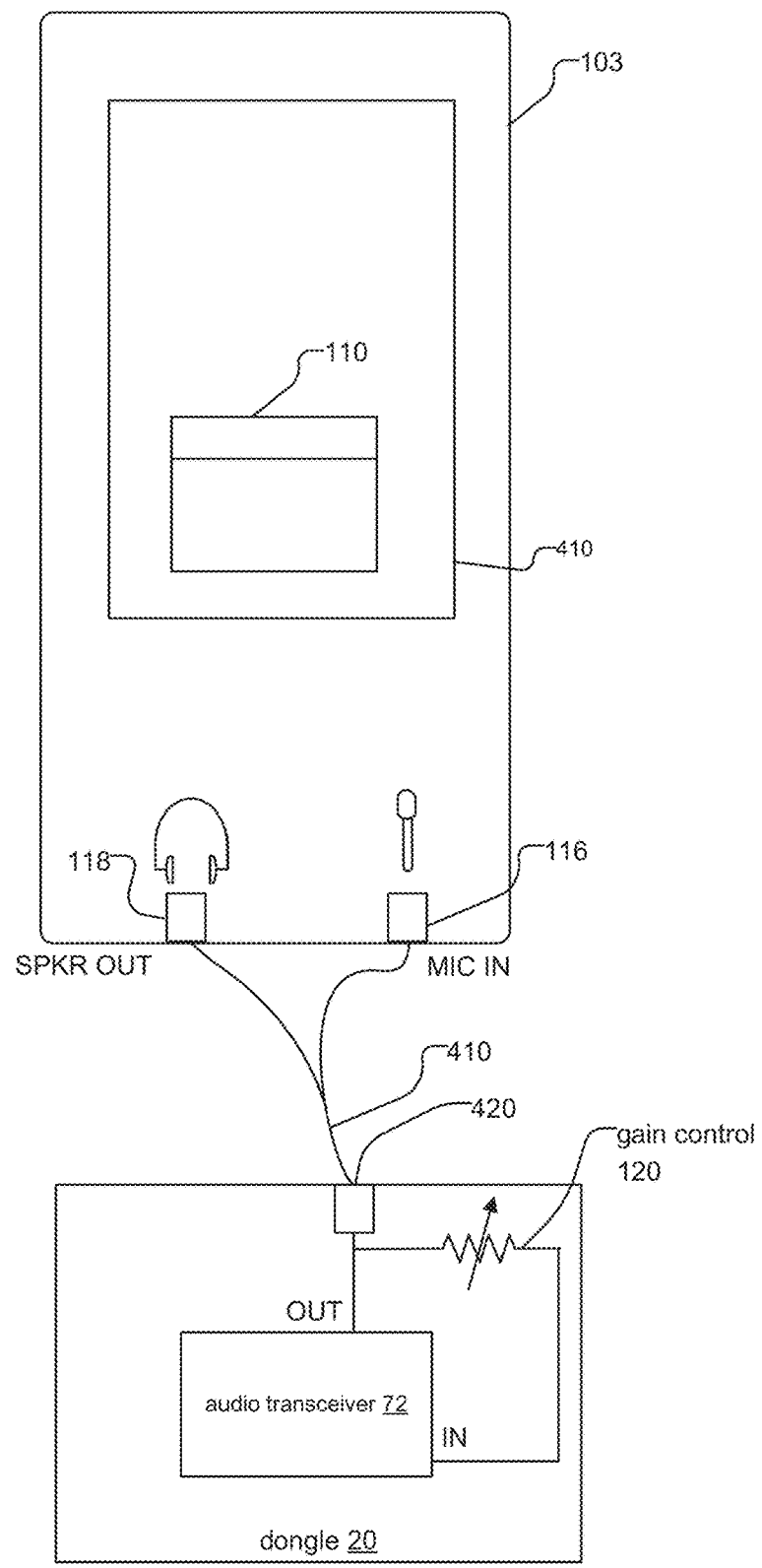

BRIEF DESCRIPTION OF THE DRAWINGS in the accompanying drawings, reference characters refer to the same parts throughout the different views. The drawings are not necessarily to scale; emphasis has instead been placed upon illustrating the principles of the invention. Of the drawings:

FIG. 1 is a block diagram of a system for diagnosis and/or configuration of security devices included within a secure network of a company's premises according to a preferred embodiment;

FIG. 2 is a schematic diagram of an exemplary audio transceiver dongle device that inserts into a mobile communication device of the system, where the mobile computing device maintains a data connection between the security device and a computer workstation that diagnoses and/or configures the security device; and FIGS. 3A and 3B are sequence diagrams that describe a method of operation for configuration of a Network Video Recorder (NVR) security device, where FIG. 3A shows the setup of a data connection between the NVR and a computer workstation and shows how the computer workstation sends commands for configuring or extracting data from the NVR over the data connection to the NVR, and where FIG. 3B shows how the NVR executes the target commands, and sends target data in response to execution of the commands back over the data connection to the computer workstation for analysis.

DETAILED DESCRIPTION OF THE PREFERRED EMBODIMENTS

FIG. 1 shows a system for enabling the diagnosis and/or configuration, for example, of a security device on a secure network that has been constructed according to the principles of the present invention.

One particular implementation of the system is shown. Specifically, in the illustrated example, a client company (Company A) maintains a corporate network 130A. This enterprise network would typically be connected to a public network 24, as is common. Company A may further maintain a separate, secure network 140. This secure network will often be associated with the internal security systems for Company A. It could also be used for highly confidential data systems such as storing financial, human resource, governmental, or military data.

In the case of a security system, these secure network devices will include devices such as network video recorders, secure servers, surveillance cameras, security panels, and access control systems.

The use of the separate secure network 140 ensures that these critical security devices are insulated from cyber attack. Moreover, security devices for the secure network 140 will often be located in a secured room 30. Security personnel, for company A that are associated with safety and security for the company, will only have access to this room 30.

In the illustrated example, a number of separate security devices for the secure network 140 are deployed in the room 30. Specifically, a secure server and/or network video recorder 40-1 along with a control panel 40-2 are located in the room 30 and communicate over the secure network 140.

In one example, the network video recorder 40-1 will store and record surveillance video data for surveillance cameras for company A, which cameras will communicate over the network 140 or a wireless network. The control panel 40-2 might be responsible for maintaining the access control systems for company A. A secure server security device will store sensitive financial, human resource, governmental, and/or military data. Moreover, such panels will often provide control for other safety equipment such as fire detection and suppression systems.

In a common example, a technician might be sent to Company A to install, troubleshoot, and/or configure the security devices 40-1, 40-2. In the case of a larger company these may be in-house personnel. On the other hand, it is not uncommon for smaller companies and some larger companies to out-source these roles.

In the illustrated example, a separate corporate entity, Company B, is shown as sending the technician. This separate company might be a manufacturer, integrator, contractor and/or subcontractor that is tasked with installing, troubleshooting, repairing or configuring the security devices and possibly maintaining the secure network 140 for Company A.

Nevertheless, it is not necessary that these roles be performed by a separate corporate entity. As noted previously, it could simply be that Company A handles these roles in-house.

Nevertheless, a separate computer diagnostic workstation is shown, this is on a separate network 130B, which may be connected to the corporate network 130A via the public network 24. Nevertheless, due to the nature of the secure network 140, the computer diagnostic workstation 70 does not have direct access to the secure network 140 and specifically the security devices 40-1, 40-2 that operate on that secure network 140, in this example.

In the illustrated example, a technician uses a technician mobile computing device 103A that establishes a data connection between one or more of the security devices 40-1, 40-2 of the secure network 140 and a remote diagnostic computer workstation 70. This data connection includes a voice connection that extends through a wide area network such as a cellular data, cellular voice network 23.

The advantage of using a data connection that includes a voice connection is that these secure networks 140 have security devices 40-1, 40-2 that are installed in rooms 30 that are often deep within buildings, such as basements or in protected and hardened center regions of large buildings. As a result, in these locations it may be only that cellular voice connections are available. Moreover, even primitive mobile computing devices such as older cellular phones and smart phones have the ability to establish and maintain cellular voice calls. As a result, since the system relies on a voice connection, it can be established with almost any cellular phone and in extreme environmental conditions.

The illustrated example shows relatively sophisticated mobile computing devices 103 such as a smart phone or tablet type computing devices. Examples include smartphones, tablet computing devices, and laptop computers running operating systems such as Windows, Android, Linux, or IOS, in examples. Each user device 103 includes a touch screen display 410 and one or more applications 110, or "apps." The apps 110 execute upon the operating systems of the user devices 103.

The technician mobile computing device 103A establishes one or more wireless data links 105-1, 105-2 to the security device 140-1, 140-2 using its wireless transceiver 112. In one example, these wireless data links 105-1, 105-2 are near field communications links or Bluetooth data links. In other examples, the wireless data links utilize wireless technologies such as Wi-Fi (IEEE 802.11), or ZigBee, to list a few examples. Moreover, wired data links could be provided between the mobile computing device 103 and the security device 140-1, 140-2 such as via a USB connection.

The data connection to remote diagnostic computer workstation 70 is established by the technician mobile computing device 103A initiating a voice call to a peer mobile computing device 103B, or vise versa. This call will typically be placed through the cellular network 23 or a WiFi call could also be placed. The peer mobile computing device then establishes a data connection to the computer diagnostic workstation over the public network 24 or directly over the computer network 130B for company B. Here, the diagnostic workstation 70 can provide commands 80 to the security device 40 or collect data 62 that is transmitted by the technician mobile computing device 103A.

The technician mobile computing device 103A encodes data onto and/or decodes data from the voice connection 50. This operation is performed using an audio transceiver dongle 20A that enables audio coupling between a microphone input and a speaker output of the mobile computing device 103A. The mobile computing device 103A further executes an application program that encodes data onto and/or decodes data from the voice connection 50 via the audio transceiver dongle 20A.

At the other end, the peer mobile computing device 103B similarly encodes data onto and/or decodes data from the voice connection 50 through the cellular network 23. This operation is performed using a second audio transceiver dongle 20B, in the illustrated example, that enables audio coupling between a microphone input and a speaker output of the peer mobile computing device 103B. The peer mobile computing device 103B further executes an application program that encodes data onto and/or decodes data from a voice connection via the audio transceiver dongle 20B.

FIG. 2 shows the mobile computing devices 103 along with their audio transceiver dangles 20. In the illustrated example, each of the mobile computing devices 103A, 103B execute the application program 110. This application program 110 obtains data from the security devices 40-1, 40-2 in the case of the technician mobile computing device 103A and encodes that data into an audio signal such as an audio signal in which the data is encoded via frequency shift keying (FSK). This encoded audio signal is generated at the speaker port 118 as an audio signal. In the illustrated example, it is coupled onto an audio cable 410 to an input port 420 of the dongle 20. The signal is provided through a gain control device 120, such as an adjustable resistor to an audio transceiver 70 as an input signal and provided back to the mobile computing device 103 on its microphone input port 116. This is received by the application program 110 and transferred over the voice connection 50.

Likewise data such as commands are received over the voice connection 50. This encoded audio signal is generated at the speaker port 118 as an audio signal. It is coupled onto the audio cable 410 to the input port 420 of the dongle 20. The signal is provided through the gain control device 120 to the audio transceiver 70 as an input signal and provided back to the mobile computing device 103 on its microphone input port 116. This is received by the application program 110 and the data derived by demodulating the audio signal.

FIGS. 3A and 3B are sequence diagrams that describe a method of operation for the diagnosis, testing, and/or configuration of a security device such as Network Video Recorder (NVR) or control panel or other secured device such as a server, for example.

Initially, these secure communications applications programs 110 must be loaded on to each of the technician mobile computing device 103A and the peer mobile computing device 103B. In a typical example, each of these devices downloads the secure communications app from an application (app) hosting system 180 that stores the secure communications apps 110 for distribution. Often, this download is provided through a public network 24. Further, the secure communications app may be hosted or distributed via the iTunes store for iOS devices or GooglePlay for Android devices.

The secure communications app is then installed on each of the mobile computing devices. Specifically, the technician mobile computing device 103A installs and executes its version of the secure app 110A in step 202A whereas the peer mobile computing device 103B executes its version of the secure app 110B in step 202B.

In the illustrated example, the peer mobile computing device 103B is shown as initiating the voice call 50 through the cellular network 23 to the technician mobile computing device 103A in step 206. In the illustrated example, possibly a data collection application program running on the computer diagnostic workstation 70 sends or provides the phone number for the technician mobile computing device 103A and to the peer mobile computing device 103B in step 204. Further, one or more commands 80 may be provided to the app by the diagnostic workstation 70. This communication may established through data links including Wi-Fi connections and may or may not include a public or enterprise network 24/130B.

Either before or after receiving this voice call, the technician mobile computing device 103A establishes a secure wireless datalink 105-1, 105-1, such as a Bluetooth connection, to the security device 40-1, 40-2 via a Bluetooth or near field transceiver of the mobile computing device in step 208.

Around this time, the technician will typically insert the first dongle 20A into the technician mobile computing device 103A in step 210A, and the second dongle 20B will be inserted into the peer mobile computing device 103B in step 210B.

The first secure apps 110A, B will in some embodiments automatically detect the insertion of the dongles 20. In this example, in response to detecting the dongle device 20A, the first secure app 110A sends a ready signal to the peer mobile computing device 103B via the voice connection 50 in step 212. This information is received by the second secure app 110B executing on the peer mobile computing device 103B via the second dongle device 20B.

In response to receiving the ready signal, the secure app 110B of the peer device 103B encodes the commands received from the diagnostic workstation 70 as a modulated audio signal. This is transmitted via the cellular network to the mobile computing device 103A in step 214.

On the technician mobile computing device 103A, the first secure app 110A receives the modulated audio signal via the voice connection 50. These audio signals are transferred via the first dongle 20A and are the decoded by the first secure app 110A in step 216.

Then in step 218, the first secure app 110 A sends the commands to the security device 40-1, 40-2 over the wireless datalinks 105-1, 105-2. In this way, commands from the diagnostic workstation 70, such as commands to request log data or configuration data or instructions to configure the security devices are transmitted via the voice connection between the two mobile computing devices 103A, 103B.

FIG. 3B shows how target data 32-1, 32-2 is transmitted from the security device 40-1, 40-2 to the diagnostic workstation 70.

In one example, the target data 32-1, 32-2 resulting from a log data command or the read-configuration command received by the security device 40-1, 40-2 are executed and the associated target log data or diagnostic data 32-1, 32-2 are transmitted to the first secure app 110A of the technician mobile computing device 103A via the wireless data connection 105-1, 105-2 in step 240.

The first secure app 110A receives this data from the security device 40-1 or 40-2 and encodes the target data 32-1, 32-2 into modulated audio signals and then transmits the audio signals via the first dongle 20A over the voice connection 50 to the second secure app 110B executing on the peer mobile computing device 103B in step 242.

In step 244, the second secure app 110B receives the audio signals over the voice connection 50 via its second dongle device 20A and decodes the audio signals back into the target data. Then the second secure app 110B sends the target data to the data collection application executing on the diagnostic workstation 70 in step 246. This transfer again can take place over the public network 24 and/or the enterprise network 130B for Company B. There the collected data can be displayed to the operator at the diagnostic workstation 70 such as a via a web browser executing on that diagnostic workstation, in step 248.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for enabling diagnosis and/or configuration of a security device on a secure network, the system comprising:
   a computer workstation used for the diagnosis and/or configuration of the security device;
   a technician mobile computing device that maintains a data connection between the security device and the computer workstation by establishing a data link to the security device and by encoding data onto and/or decoding data from a voice connection; and
   a peer mobile computing device that communicates with the technician mobile computing device over the voice connection and encodes the data onto and/or decodes the data from the voice connection for the computer workstation, wherein the peer mobile computing device encodes the data onto and/or decodes the data from the voice connection via an audio transceiver dongle that enables audio coupling between a microphone input and a speaker output of the peer mobile computing device.

2. The system of claim 1, wherein the data link is a short distance wireless link.

3. The system of claim 1, wherein the data link is a near field communications link or Bluetooth radio frequency link.

4. The system of claim 1, wherein the security device is a network video recorder.

5. The system of claim 1, wherein the security device is a security control panel.

6. The system of claim 1, wherein the peer mobile computing device communicates with the computer workstation over WiFi.

7. The system of claim 1, wherein the computer workstation receives data over the data connection from the security device for the diagnosis of the security device.

8. The system of claim 1, wherein the computer workstation sends target commands over the data connection for the configuration of the security device.

9. The system of claim 1, wherein the technician mobile computing device includes a first secure application program that encodes the data onto and/or decodes the data from the voice connection using frequency shift key modulation of an audible frequency carrier wave.

10. A system for enabling diagnosis and/or configuration of a security device on a secure network, the system comprising:
    a computer workstation used for the diagnosis and/or configuration of the security device; and
    a technician mobile computing device that maintains a data connection between the security device and the computer workstation by establishing a data link to the security device and by encoding data onto and/or decoding data from a voice connection;
    wherein the technician mobile computing device encodes the data onto and/or decodes the data from the voice connection via an audio transceiver dongle that enables audio coupling between a microphone input and a speaker output of the technician mobile computing device.

11. A method for enabling diagnosis and/or configuration of a security device on a secure network, the method comprising:
    establishing a data connection between the security device and a computer workstation by establishing a data link between a technician mobile computing device and the security device and establishing a voice connection between the technician mobile computing device and the computer workstation;
    transmitting data and/or commands over the data connection between the security device and the computer workstation by encoding data onto and/or decoding data from the voice connection; and
    the technician mobile computing device transmitting the data and/or commands over the voice connection via an audio transceiver dongle that enables audio coupling between a microphone input and a speaker output of the technician mobile computing device.

12. The method of claim 11, wherein the voice connection between the technician mobile computing device and the computer workstation comprises a peer mobile computing device communicating with the technician mobile computing device over a cellular network.

13. The method of claim 12, further comprising the peer mobile computing device communicating with the computer workstation over WiFi.

14. The method of claim 11, further comprising the computer workstation receiving data over the data connection from the security device for the diagnosis of the security device.

15. The method of claim 11, further comprising the computer workstation sending the commands over the data connection for the configuration of the security device.

16. The method of claim 15, further comprising the security device:
    executing the commands sent by the computer workstation; and
    sending the data for the diagnosis of the security device over the data connection to the computer workstation in response to executing the commands.

17. The method of claim 11, wherein encoding the data onto and/or decoding the data from the voice connection comprises a first secure application program of the technician mobile computing device using frequency shift key modulation of an audible frequency carrier wave.

18. The method of claim 11, wherein the wireless data link between the technician mobile computing device and the security device comprises a Bluetooth connection.

* * * * *